United States Patent [19]
Dowling et al.

[11] Patent Number: 5,751,466
[45] Date of Patent: May 12, 1998

[54] PHOTONIC BANDGAP APPARATUS AND METHOD FOR DELAYING PHOTONIC SIGNALS

[75] Inventors: Jonathan P. Dowling, Fayetteville, Tenn.; Michael Scalora, Huntsville, Ala.; Mark J. Bloemer, Athens, Ala.; Charles M. Bowden; Rachel J. Flynn, both of Huntsville, Ala.; Richard L. Fork, Madison, Ala.; Senter B. Reinhardt, Jr.; Michael D. Tocci, both of Huntsville, Ala.

[73] Assignee: University of Alabama at Huntsville, Huntsville, Ala.

[21] Appl. No.: 584,403

[22] Filed: Jan. 11, 1996

[51] Int. Cl.⁶ .................... G02F 1/03; G02B 1/10; G02B 5/28; G02B 6/12
[52] U.S. Cl. .................... 359/248; 359/260; 359/263; 359/586; 359/587; 359/588; 359/589; 385/14; 385/122
[58] Field of Search .................... 359/260, 248, 359/586, 587, 588, 589, 263; 257/25, 189; 385/14, 122

[56] References Cited

U.S. PATENT DOCUMENTS

| | | | |
|---|---|---|---|
| H1182 | 5/1993 | Spry | 359/588 |
| 3,410,625 | 11/1968 | Edwards | 359/588 |
| 3,637,294 | 1/1972 | Berthold, III | 359/588 |
| 3,697,153 | 10/1972 | Zycha | 359/588 |
| 3,706,485 | 12/1972 | Fawcett et al. | 359/588 |
| 3,759,604 | 9/1973 | Thelen | 359/588 |
| 3,853,386 | 12/1974 | Ritter et al. | 359/588 |
| 3,914,023 | 10/1975 | Thelen | 359/588 |
| 4,441,789 | 4/1984 | Pohlack | 359/588 |

(List continued on next page.)

OTHER PUBLICATIONS

Sprung et al., "Scattering by a Finite Periodic Potential", Am. J. Phys., vol. 61, No. 12, Dec. 1993, pp. 1118–1124.
Yariv et al., Optical Waves in Crystals: Propagation and Control of Laser Radiation, John Wiley & Sons, pp. 439, 442, 444–447, 1984.
Liddell, Basic Theory and Notation for Multilayer Filter Calculations, Chapter 1, Adam Hilger, Ltd., Bristol, 1981.
Dowling et al., "The Photonic Band Edge Laser: A new Approach to Gain Enhancement", J. Appl. Phys., V. 75, No. 4, Feb. 15, 1994, pp. 1896–1899.
Scalora et al., "A Beam Propagation Method that Handles Reflections", Optics Communications, V. 108, 1994, pp. 191–196.
Scalora et al., "The Photonic band Edge Optical Diode", J. Appl. Phys., V. 76, No. 4, Aug. 15, 1994, pp. 2023–2026.
Scalora et al., "Optical Limiting and Switching of Ultrashort Pulses in Nonlinear Photonic Band Gap Materials", Physical Review Letters, V. 73, No. 10, Sep. 5, 1994, pp. 1368–1371.
Tocci et al., "Thin–Film Nonlinear Optical Diode", Appl. Phys. Lett, V. 66, No. 18, May 1, 1995, pp. 2324–2326.
Scalora et al., "Dipole Emission Rates in One–Dimensional Photonic Band–Gap Materials", Appl. Phys. B, V. 60, 1995, pp. S57–S61.
Scalora et al., "Pulse Propagation Near Highly Reflective Surfaces: Applications to Photonic Band-gap Structures and the Question of Superluminal Tunneling Times", Physical Review A, Vol. 52, No. 1, Jul. 1995, pp. 726–734.

*Primary Examiner*—Frank G. Font
*Assistant Examiner*—Evelyn A. Lester
*Attorney, Agent, or Firm*—Bell Seltzer Intellectual Property Group of Alston & Bird, LLP

[57] ABSTRACT

A photonic signal is applied to a photonic bandgap structure having a photonic band edge transmission resonance at the frequency of the photonic signal and having a photonic band edge transmission resonance bandwidth which is at least as wide as the bandwidth of the photonic signal. When a photonic band edge transmission resonance is matched to the photonic signal which is being transmitted, a controllable delay is imparted to the photonic signal without significantly altering the photonic signal itself.

28 Claims, 8 Drawing Sheets

U.S. PATENT DOCUMENTS

| | | | |
|---|---|---|---|
| 4,726,655 | 2/1988 | Mahlein | 359/588 |
| 4,756,602 | 7/1988 | Southwell et al. | 359/588 |
| 4,770,496 | 9/1988 | Mahlein | 359/588 |
| 5,148,504 | 9/1992 | Levi et al. | 385/14 |
| 5,179,468 | 1/1993 | Gasloli | 359/588 |
| 5,315,437 | 5/1994 | Alfano et al. | 359/588 |
| 5,448,404 | 9/1995 | Schrenk et al. | 359/584 |
| 5,559,825 | 9/1996 | Scalora et al. | 359/584 |

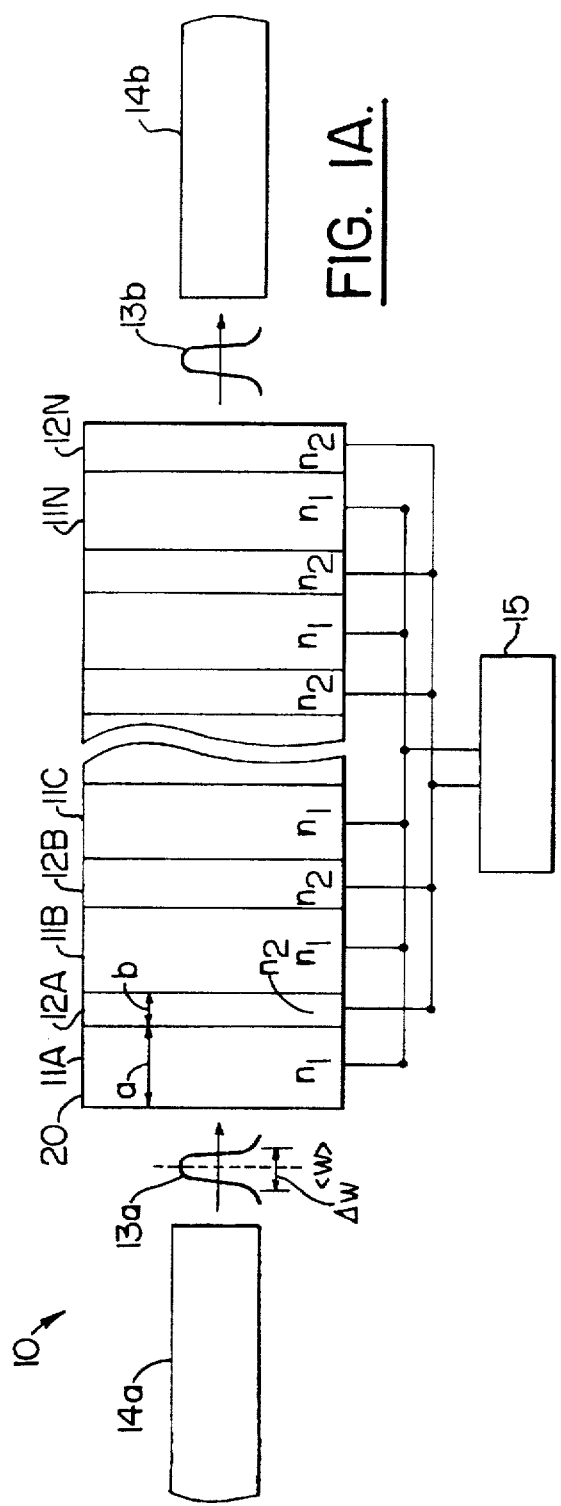
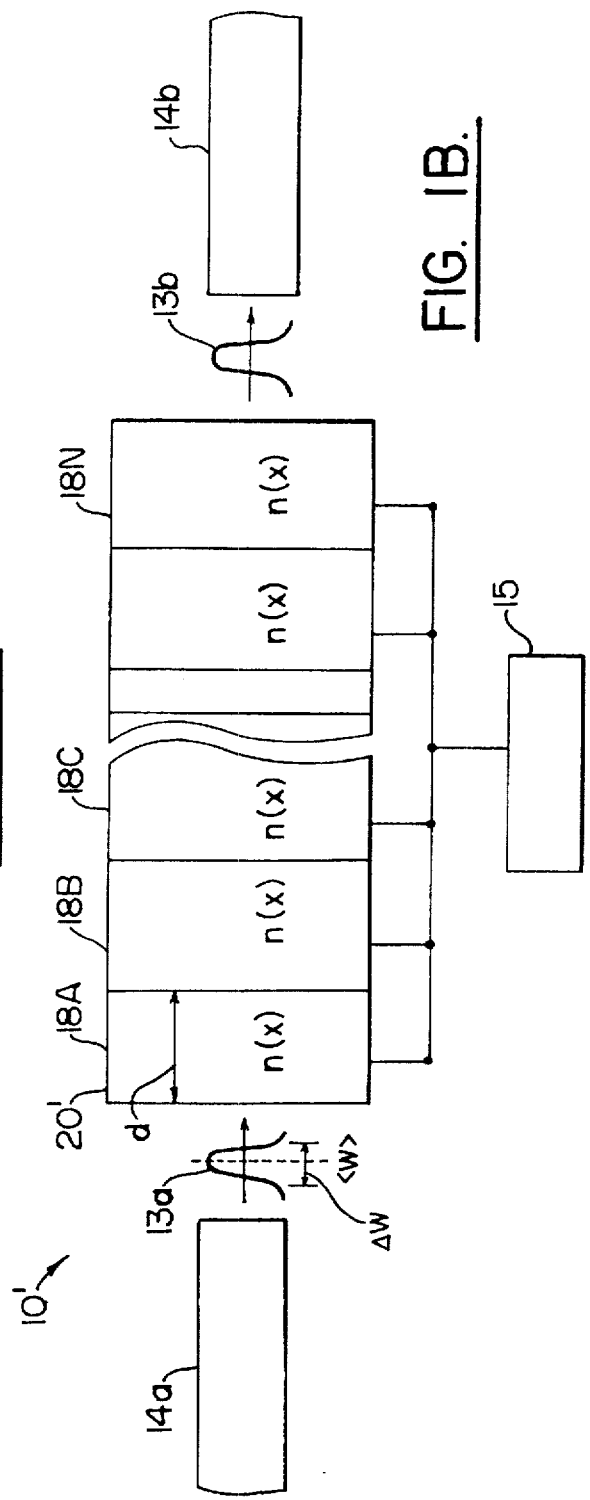

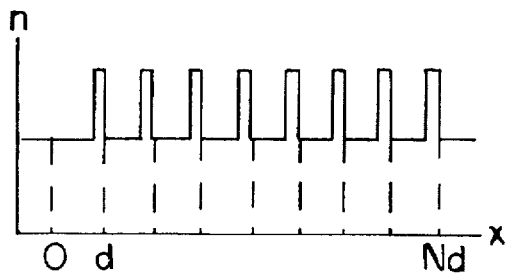
FIG. 7A.
FIG. 7B.
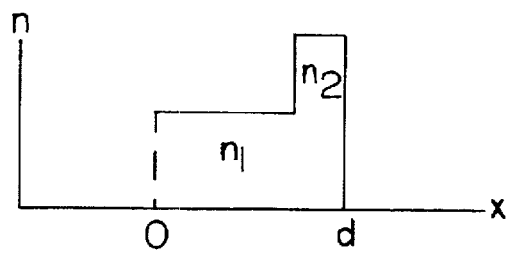
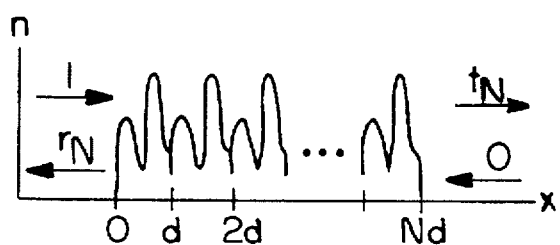
FIG. 8A.
FIG. 8B.
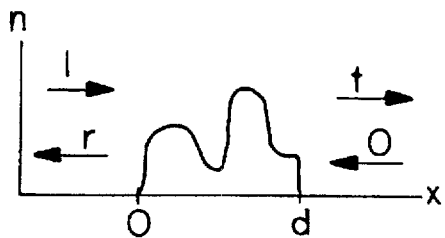

PHOTONIC BANDGAP APPARATUS AND METHOD FOR DELAYING PHOTONIC SIGNALS

FIELD OF THE INVENTION

This invention relates to processing of photonic signals, and more particularly to delaying of photonic signals.

BACKGROUND OF THE INVENTION

Photonic signals are widely used for data processing and communications applications. As is well known to those having skill in the art, photonic signals include electromagnetic signals such as optical signals, x-ray signals and microwave signals. Because of their enhanced properties compared to conventional electrical signals, photonic signals are widely being investigated as replacements for electrical signals in data processing and communications applications. Thus, for example, optoelectronic devices are replacing conventional electrical devices, and optical interconnections are replacing electrical interconnections in data processing systems.

A major building block of a system which uses photonic signals is a delay block. Low distortion, controllable delays are generally required to synchronize photonic signals. Moreover, a delay apparatus and method is also required for applications such as information processing, phased array antennas, information routing, and other applications in the telecommunications, commercial, consumer and military fields.

A high quality delay apparatus and method should provide a large, controllable delay for short photonic pulses. In particular, for a photonic pulse signal having a predetermined frequency and a predetermined bandwidth, it is desirable for the delay apparatus and method to provide a controlled amount of delay at the predetermined frequency, and which is uniform across the signal bandwidth. Accordingly, photonic signals at the predetermined frequency and having the predetermined bandwidth can be passed through the delay apparatus substantially unaltered, while imparting the predetermined delay to the signals.

Moreover, as electronic systems become more compact and lightweight it is important for the photonic delay to be implemented in a compact, lightweight apparatus which is compatible with other integrated optoelectronic systems. The apparatus should be easy to manufacture using conventional techniques and should be operable with signals of virtually any frequency.

SUMMARY OF THE INVENTION

It is therefore an object of the present invention to provide apparatus and methods for delaying photonic signals.

It is another object of the present invention to provide apparatus and methods which produce uniform delay of photonic signals over their bandwidth.

It is yet another object of the invention to provide apparatus and methods for delaying photonic signals having predetermined frequency and predetermined bandwidth without distorting the photonic signals.

These and other objects are provided according to the present invention by applying a photonic signal to a photonic bandgap structure having a photonic band edge transmission resonance at the frequency of the photonic signal and having a corresponding photonic band edge transmission resonance bandwidth which is at least as wide as the bandwidth of the photonic signal. A predetermined delay is thereby imparted to the photonic signal which passes therethrough.

As is well known to those having skill in the art, a one-dimensional photonic bandgap structure includes a plurality of layers which exhibit a series of photonic bandgaps. In a first, specific, embodiment, the photonic bandgap structure includes a predetermined plurality of first and second alternating layers which exhibit a series of photonic bandgaps in their transmission spectra. The first and second alternating layers have a predetermined thickness, and have predetermined indices of refraction. In particular, the first alternating layers have a relatively low index of refraction, $n_1$, and the second alternating layers have a relatively high index of refraction, $n_2$. The thicknesses of the layers also alternate such that the thickness a,b, of the first and second layers respectively, are $\lambda/(4n_1)$ and $\lambda/(4n_2)$ where $\lambda$ is the free space wavelength. Such a structure is also referred to as a distributed Bragg reflector. A range of wavelengths centered at $\lambda$ will be reflected. In other words, propagation of those wavelengths are not allowed inside the structure. Accordingly, a series of "photonic bandgaps" in the transmission spectra is obtained.

More generally, a second embodiment of a photonic bandgap structure includes a plurality of unit cells, each having variable index of refraction thereacross. Each unit cell is about $\lambda/2$ in thickness. For example, the unit cell may be a single layer having an arbitrary, variable index profile across the thickness thereof. Alternatively, the unit cell may be three layers having three different, constant indices of refraction. As in the specific embodiment described above, a range of wavelengths centered about $\lambda$ will be reflected. Accordingly, a photonic bandgap is obtained near $\lambda$, with higher order gaps near $3\lambda$, $5\lambda$, etc.

Other embodiments of a photonic bandgap structure induce a periodically varying index of refraction in a material by application of an external electromagnetic field (such as optical energy) having spatial variation in different regions of the material. These structures may be referred to as "optically induced" photonic bandgap structures. The frequency of the external electromagnetic field will generally be close to, or the same as, the frequency of the photonic signal. In fact, in some cases, the photonic signal itself may induce a field in the material to vary the index of refraction and thereby create a photonic bandgap structure. These structures may be referred to as "self generating" photonic bandgap structures.

Outside the photonic bandgaps, the photonic bandgap structure exhibits a series of band edge transmission resonances. According to the invention, the thickness and/or number of layers in the photonic bandgap structure and/or their indices of refraction (constant or variable) are selected to produce a photonic band edge transmission resonance having a photonic band edge transmission resonance center frequency corresponding to the predetermined frequency of the photonic signal and a corresponding photonic band edge transmission resonance bandwidth which is at least as wide as the predetermined bandwidth of the photonic signal.

It has been found, according to the invention, that when a photonic band edge transmission resonance is matched to the photonic signal which is being used, a controllable delay is imparted to the photonic signal without significantly altering the photonic signal itself. Matching of the photonic signal to the photonic band edge resonance is obtained by designing the photonic bandgap structure such that one of its transmission resonances has a transmission resonance center frequency corresponding to the frequency of the photonic signal and a photonic band edge transmission resonance bandwidth which is at least as wide as the bandwidth of the photonic signal.

As already described, the photonic bandgap structure exhibits a series of photonic band edge transmission resonances extending away from each photonic bandgap. Preferably, in the first embodiment, a band edge transmission resonance which is closest to either side of a photonic bandgap, and most preferably closest to the lowest order photonic bandgap, is used for matching to the photonic signal which is to be delayed. Accordingly, in the first embodiment, the number, thicknesses and/or indices of refraction of the layers are preferably selected to cause one of the closest photonic band edge transmission resonances to have a photonic band edge transmission resonance center frequency corresponding to the predetermined frequency and a photonic band edge transmission resonance bandwidth which is at least as wide as the predetermined bandwidth. In the first embodiment, when a closest transmission resonance frequency is matched to the photonic signal frequency and a closest transmission resonance bandwidth is at least as wide as the bandwidth of the photonic signal, a uniform predetermined delay can be imparted to the photonic signal without significant distortion of the signal.

In the second embodiment, a band edge transmission resonance which is not closest to a bandgap may provide the best combination of a large, uniform delay.

A photonic bandgap structure may be designed according to the first embodiment of the invention to have a predetermined delay for photonic signals of predetermined frequency and predetermined bandwidth by having a predetermined plurality, N, of first and second alternating layers having an index of refraction parameter $T_{12}$ of $4n_{12}/(n_1+n_2)^2$ and a thickness of each layer of $\pi c/(2\omega_0 n_1)$ and $\pi c/(2\omega_0 n_2)$ such that:

$$1/T_{12}=[1+\cos \pi/N \cos \pi/(2N)]/[1-\cos (\pi\Delta\omega/\omega_0) \cos (\pi<\omega>/\omega_0)],$$

and $$1/T_{12}=[\sin \pi/N \sin \pi/(2N)]/[\sin (\pi\Delta\omega/\omega_0) \sin (\pi<\omega>/\omega_0)],$$

where $<\omega>$ is the predetermined frequency of the photonic signal, $\Delta\omega$ is the predetermined bandwidth of the photonic signal, $\omega_0$ is the mid-gap frequency of the photonic bandgap structure, and c is the free space velocity of light. Since $T_{12}$, $\Delta\omega$ and $<w>$ are known, these two equations may be solved for the two unknown parameters of the photonic bandgap structure: $\omega_0$ the mid-gap frequency, and N the number of first and second layers. A numerical root-finding routine can be used to find appropriate values for $w_0$ and N, given $T_{12}$. For example, a photonic bandgap structure of gallium arsenide and aluminum arsenide (GaAs/AlAs) having 30 sets of alternating layers can produce a delay of 0.36 psec (108 µm) for a signal at 1.52 µm with a bandwidth of 2.3 nm (307 GHz).

A photonic bandgap structure may also be designed according to the second, general embodiment of the invention to match the predetermined bandwidth $\Delta\omega$ and the predetermined frequency $<\omega>$ of the photonic signal to a photonic band edge resonance of the photonic bandgap structure including a predetermined plurality of unit cells, each having a predetermined thickness and a variable index of refraction $n(x)$, across the predetermined thickness. An initial index profile $n(x)$ functional form geometry is specified, and the group index $\rho_N=1/V_g$ for an N-unit cell photonic bandgap structure is determined. N is varied until the width of one of the photonic band edge resonances matches the required bandwidth $\Delta\omega$ of the photonic signal. The index profile $n(x)$ of the unit cell is then rescaled. The group index is then calculated until the predetermined frequency $<\omega>$ of the band edge resonance under consideration matches the desired predetermined frequency of the photonic signal $<\omega>$. This procedure is repeated iteratively until both $\Delta\omega$ and $<\omega>$ are obtained to within a desired degree of accuracy. Other photonic bandgap structures may be designed to have a photonic band edge transmission resonance which is matched to the photonic signal using other known techniques and techniques which may be developed in the future.

According to another aspect of the invention, the amount of delay can be varied by applying a predetermined voltage or set of voltages to the layers of the photonic bandgap structure to thereby further vary the index of refraction thereof. In this case, at least one of the layers should be fabricated of electrooptic material, the index of refraction of which changes in response to an applied voltage. Alternatively, the amount of delay can be varied by applying an external electromagnetic (optical) field to the structure to further vary the index of refraction inside the structure. In yet another alternative, the frequency of the applied signal may be varied to induce variation in the internal index of refraction.

A delay apparatus and method for delaying photonic signals by a predetermined delay with low distortion is thereby provided. The delay apparatus and method may be used to fabricate a large class of optoelectronic devices such as frequency shifters, limiters, switches and the like.

BRIEF DESCRIPTION OF THE DRAWINGS

FIGS. 1A and 1B are schematic representations of first and second embodiments of an apparatus and method for delaying photonic signals according to the present invention.

FIGS. 7A and 7B graphically illustrate example indices of refraction for the first embodiment of FIG. 1A.

FIGS. 8A and 8B graphically illustrate example indices of refraction for the second embodiment of FIG. 1B.

DETAILED DESCRIPTION OF PREFERRED EMBODIMENTS

Figure 2:
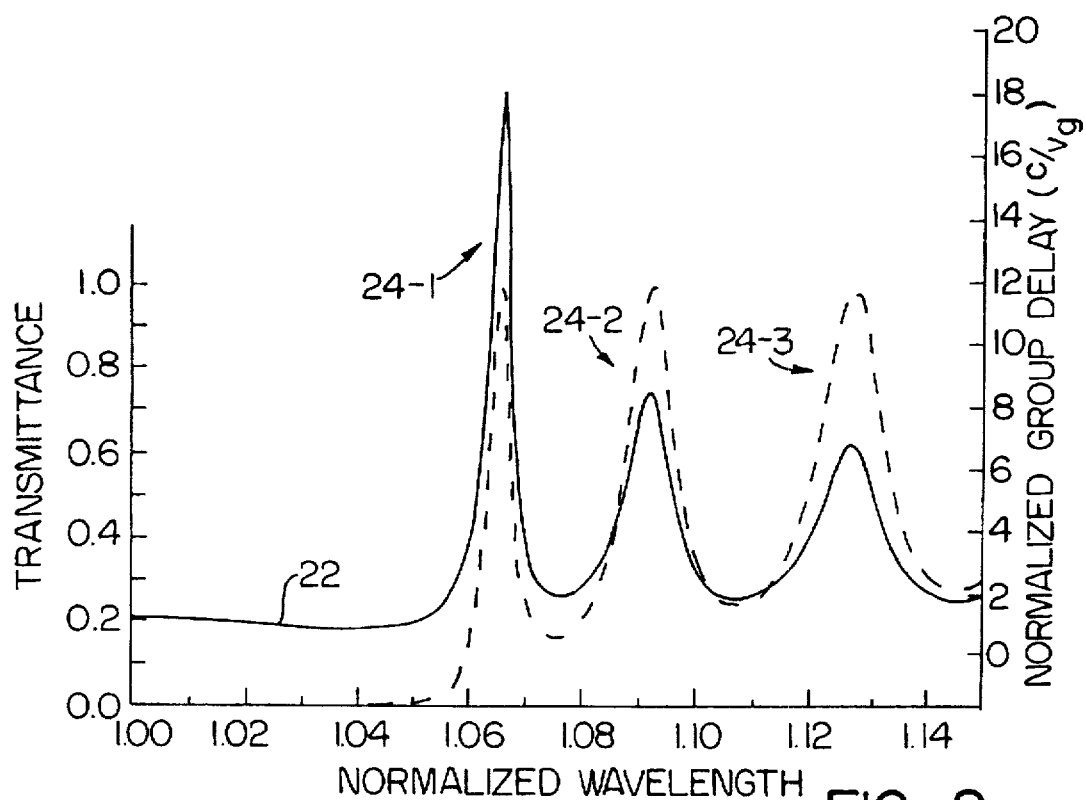
FIG. 2 graphically illustrates the theoretical transmittance and group delay of a photonic bandgap structure according to the present invention.

The present invention now will be described more fully hereinafter with reference to the accompanying drawings, in which preferred embodiments of the invention are shown.

This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout.

Referring now to FIGS. 1A and 1B, schematic representations of apparatus and methods for delaying photonic signals according to the present invention, are shown. Referring to FIG. 1A, the apparatus 10 receives photonic signals 13$a$ of predetermined frequency <$\omega$> and predetermined bandwidth $\Delta\omega$ and imparts a predetermined delay to the photonic signals 13$a$ to thereby produce delayed photonic signals 13$b$. Preferably, photonic signals 13$b$ replicate signals 13$a$ in terms of pulse shape, but are delayed by a predetermined delay.

Still referring to FIG. 1, apparatus 10 includes a first embodiment of a photonic bandgap structure 20 having a predetermined plurality N of first and second alternating layers 11A ... 11N and 12A ... 12N, respectively. The first and second alternating layers have predetermined thicknesses a,b, respectively, and have predetermined indices of refraction $n_1$ and $n_2$ respectively.

As is well known to those having skill in the art, the photonic bandgap structure 20 includes a multi-layer stack of material which is arranged in such a way that alternating layers have a relatively high index of refraction $n_2$ and a relatively low index of refraction $n_1$, and the thickness of each layer also alternates such that a=$\lambda/(4n_1)$ and b=$\lambda/(4n_2)$, where $\lambda$ is the free space wavelength of the photonic signal 13$a$. The plurality of layers form a reflective dielectric coating. Such a structure is also referred to as a "distributed Bragg reflector".

A range of wavelengths centered at $\lambda$, 3$\lambda$, 5$\lambda$. . . will be reflected; that is, propagation of those wavelengths will not take place inside the structure 20. Thus, the structure is referred to as a "photonic bandgap" structure, in analogy with electronic bandgaps of semiconductor theory. The bandgap regions of these structures has been widely investigated. See for example the publications entitled *A Beam Propagation Method That Handles Reflections* by co-inventors Scalora et al., *Optics Communications* (Vol. 108); pp. 191–196, (1994); and *Optical Limiting and Switching of Ultra-Short Pulses in Non-Linear Photonic Bandgap Materials* by co-inventor Scalora et al., *Physical Review Letters* (Vol. 73 No. 10); pp. 1368–1371, (1994).

Referring now to FIG. 1B, a second embodiment of apparatus 10' includes a second embodiment of a photonic bandgap structure 20' having a predetermined plurality N of unit cells 18A–18N, each having thickness d and having an index of refraction n(x) which varies across the thickness d of the unit cell. For example, optically induced photonic bandgap structures or self-generated photonic bandgap structures, as described above, may be used.

As is well known to those having skill in the art, when d≈$\lambda/2$ and the variable index of refraction n(x) is the same for each unit cell 18A–18N, a photonic bandgap structure is formed. It will also be understood by those having skill in the art that the photonic bandgap structure 20 of FIG. 1A may be viewed as a special case of the photonic bandgap structure 20' of FIG. 1B, wherein the function n(x) is a step function of two different indices of refraction. However, the function n(x) may be any linear or nonlinear, continuous or discontinuous, function of the thickness d. Accordingly, unit cells 18A–18N may be viewed as a single layer with a varying index of refraction or a plurality of layers, each of which has a constant or varying index of refraction, as long as a periodic structure is produced by a plurality of unit cells 18A–18N. Other photonic bandgap structures now known or discovered hereafter may also be used in a delay apparatus and method according to the present invention. For example, optically induced photonic bandgap structures or self-generated photonic bandgap structures, as described above, may be used.

As is well known to those having skill in the art, semiconductor materials may be used to fabricate the photonic bandgap structure 20, 20'. In these applications, the semiconductor materials are being used for their optical properties, rather than for their electrical properties. However, because semiconductor materials may be formed with atomic layer precision using microelectronic manufacturing techniques, they are well suited for use in a photonic bandgap structure. Accordingly, the photonic bandgap structure may be formed by a heteroepitaxial structure of lattice matched semiconductor materials such as gallium arsenide and aluminum arsenide. Other techniques for forming photonic bandgap structure 20, 20' may also be used.

Still referring to FIGS. 1A and 1B, the delaying apparatus 10, 10' also includes means for directing the photonic signals 13$a$ into the first layer 11A of the photonic bandgap structure 20, 20'. A fiber optic cable 14$a$, lens or other conventional directing means may be used. Similarly, means for receiving the delayed photonic signals 13$b$ which emerge from the last layer 12N of the photonic bandgap structure 20, 20' is also provided. The receiving means may be embodied by a fiber optic cable 14$b$, a lens or other conventional receiving means.

Finally, as also illustrated in FIGS. 1A and 1B, means for varying the index of refraction of at least one of the layers may be provided, to thereby vary the predetermined delay. Index of refraction varying means may be provided by voltage applying means 15 which applies a predetermined voltage to first layers 11A–11N, second layers 12A–12N or both, or to one or more of unit cells 18A–18N, to thereby vary the indices of refraction. In these applications, photonic bandgap apparatus 20, 20' is preferably fabricated, at least in part, of electrooptic materials, the index of refraction of which changes in response to an applied voltage. In another alternative, an external electromagnetic (for example, optical) field may be applied to the photonic bandgap structure 20, 20' to further vary the index of refraction and thereby vary the predetermined delay. In yet another alternative, the photonic signal itself may be used to further vary the index of refraction, and thereby vary the predetermined delay.

It will be understood by those having skill in the art that the present invention may be employed with any photonic radiation such as optical, x-ray, or microwave radiation. However, since optical signals are now being widely investigated for data processing, communications, and other applications, optical signals will now be described.

According to the invention, it has been discovered that an ultra-short optical pulse 13$a$ which is incident at a transmission resonance, and for the first embodiment preferably a closest transmission resonance to the lowest order bandgap, of a photonic bandgap structure 20, 20', excites a novel photonic state. This state shows a marked photonic localization and a close approach to invariant transmission of the pulse. While not wishing to be bound by any theory of operation, it appears that this unusual combination of properties results from a coherent, resonant, momentum exchange between the ultra-short pulse 13a and the states of the photonic bandgap structure. A spatial separation of the optical electric and magnetic fields mediates this exchange, and results in transient energy storage in a quasi-standing wave in the photonic bandgap structure.

Although the bandgap characteristics of photonic bandgap structures have been widely investigated, it can also be shown that a photonic bandgap structure exhibits a series of N transmission resonances in each pass band of the one dimensional, N-period photonic bandgap structure. Each of these resonances exhibits peak transmittance near unity and a large group index. The more pronounced combinations of these properties occurs at the resonances close to the bandgaps, referred to as the band edge resonances. The most pronounced combination of these properties generally occurs at the band edge resonances which are closest to a bandgap.

FIG. 2 graphically illustrates the theoretical transmittance T (dashed line) and group delay $n_g=c/v$ (solid line) of a photonic bandgap structure including 30 layers of gallium arsenide (GaAs) and aluminum arsenide (AlAs), plotted versus mid-gap normalized wavelength $\omega/\omega_0$, at the long wavelength edge of a photonic bandgap. In FIG. 2, the lowest order bandgap is indicated by 22 and three band edge transmission resonances are indicated by 24-1, 24-2 and 24-3. The closest band edge resonance is indicated by 24-1, since it is closest to the lowest order bandgap 22. It will be understood that in the first pass band there are a series of 30 resonances where transmittance T is near unity and group delay $n_g$ is also locally maximal. The absolute maximum in $n_g$ at the first band edge resonance 24-1 is shown. The group delay may be defined by $\delta=(n_g-1)L$, where L is the total length of the photonic bandgap structure. It has been discovered according to the invention that the particular band edge detuning of the wavelength away from the mid-gap Bragg condition results in efficient transmission with minimal distortion while also increasing the group delay by an order of magnitude or more compared to free space.

Figure 3A:
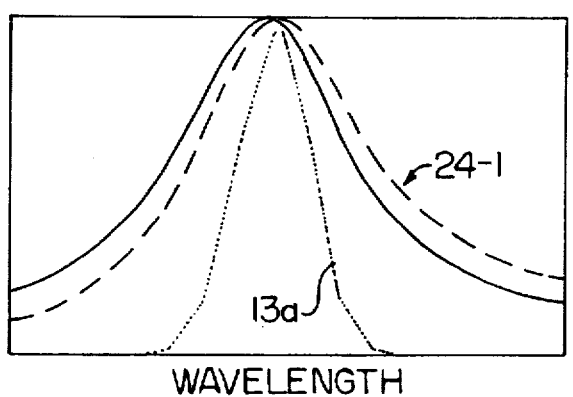
FIG. 3A illustrates an enlarged view of group delay at the long wavelength band edge resonance, and the bandwidth of a pulse that fits within the resonance, according to the present invention.
Figure 3B:
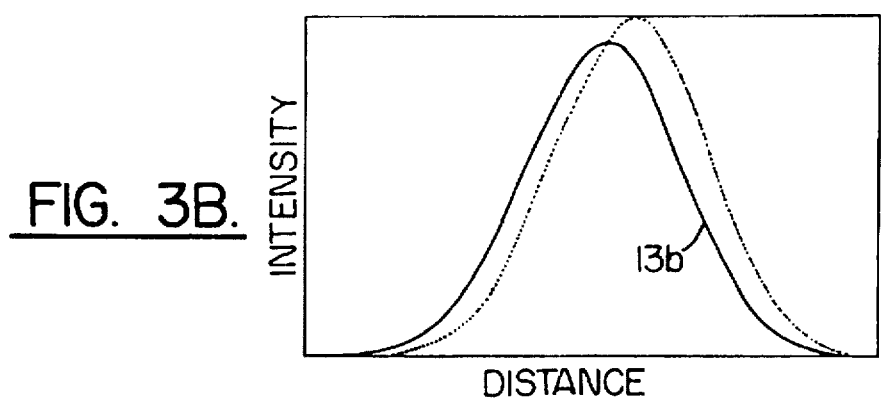
FIG. 3B illustrates an enlarged view of an incoming optical pulse and a delayed optical pulse according to the present invention.

FIG. 3A illustrates an enlarged view of the $n_g$ curve (solid line) at the long wavelength band edge resonance 24-1, with the dotted line representing the bandwidth of a two picosecond pulse 13a that fits well within the resonance (dashed line). FIG. 3B illustrates a simulated comparison of the peak-to-peak group delay of a 2 picosecond pulse 13b that propagates through the photonic bandgap structure 20 at the band edge (solid line) to a control pulse in bulk material (dotted line). As shown, the pulse 13b is transmitted through a simulated 7 µm thick photonic bandgap structure at a delay of nearly 110 µm, corresponding to a group index of $n_g=c/v_g$ of about 17. The preservation of pulse shape and amplitude is clearly shown.

Techniques for matching the location and bandwidth of a band edge resonance to the frequency and bandwidth of the photonic signal for a predetermined delay will now be described, for each of the embodiments of FIGS. 1A and 1B. Referring again to FIG. 1A, assume that the predetermined bandwidth of the photonic signal 13a is given by $\Delta\omega$ and the center frequency or carrier frequency of the photonic signal is given by $<\omega>$. A typical case would be a series of transform limited optical pulses having an approximately Gaussian shape, a bandwidth $\Delta\omega$, a duration $T_r \cong 0.44/\Delta\omega$ at some repetition rate $\omega_r$. A photonic bandgap structure 20 with a band edge transmission resonance that is located close to $<\omega>$ and has a bandwidth slightly in excess of $\Delta\omega$ is desired, according to the invention.

In general, the indices of refraction of the alternating layers $n_1$ and $n_2$, are constrained by the physical properties of the materials that can be microfabricated with the needed precision. Accordingly, $n_1$ and $n_2$, or at least some trial set of indices, may be specified. A solution for the values of the mid-gap frequency $\omega_0$ and the number of first and second layers N required to fabricate the correct photonic bandgap structure is desired.

The properties of a photonic bandgap structure are first calculated. For a photonic bandgap structure of FIG. 1A, each layer is generally designed so that the optical path is exactly ¼ of some reference wavelength $\lambda_0$ corresponding to the mid-gap frequency $\omega_0$. This parameter specifies the layer thicknesses a and b of the alternating layers according to the relation:

$$n_1 a = n_2 b = \lambda_0/4 = \pi c/(2\omega_0),$$

so that $$a=\pi c/(2\omega_0 n_1) \text{ and } b=\pi c/(2\omega_0 n_2).$$

For a quarter-wave stack, $\cos\beta=(\cos\pi(<\omega>/\omega_0)-R_{12})/T_{12}$. Also, the lower band edge maximum for $\rho_N$ is located between $\beta=((2N-1)/N)(\pi/2)$ and $\beta=((2N-3)/N)(\pi/2)$. Define the quantities:

$$\Delta\omega=(\omega_1-\omega_2)/2$$

and $$<\omega>=(\omega_1+\omega_2)/2$$

which are known spectral width $\Delta\omega$ and central frequency $<\omega>$ of the photonic signal. Here, $\omega_1$ and $\omega_2$ are the lower and upper limits respectively, of the spectral range of the photonic signal to be delayed. The following two equations relate the two edge frequencies in $\beta$-space to those in $\omega$-space:

$$\cos[\pi\omega_1/\omega_0]=R_{12}-T_{12}\cos 3\pi/(2N)$$

$$\cos[\pi\omega_2/\omega_0]=R_{12}-T_{12}\cos \pi/N$$

where $R_{12}\equiv(n_1-n_2)^2/(n_1+n_2)^2$ and $T_{12}=4n_1n_2/(n_1+n_2)^2$. By adding and then subtracting these two equations, another pair of equations is obtained in $\Delta\omega$ and $<\omega>/\omega_0$:

$$1/T_{12}=[1+\cos \pi/N \cos \pi/(2N)]/[1-\cos(\pi\Delta\omega/\omega_0)\cos(\pi<\omega>/\omega_0)]$$

$$1/T_{12}=[\sin \pi/N \sin \pi/(2N)]/[\sin(\pi\Delta\omega/\omega_0)\sin(\pi<\omega>/\omega_0)].$$

Since $T_{12}$, $\Delta\omega$ and $<\omega>$ are assumed to be known, the last two equations specify two equations for the two unknowns $\omega_0$ and N, the mid-gap frequency and the predetermined number of first and second layers respectively. A numerical root-finding routine can be used to find appropriate values for $\omega_0$ and N, given $T_{12}$ (or $n_1$ and $n_2$).

As an example, suppose $n_1=2.9$, $n_2=3.2$, $\omega=2.154\times10^{15}$ rad/s, and $\Delta\omega=0.215\times10^{15}$ rad/s. This corresponds to a photonic bandgap structure fabricated from alternating layers of low index aluminum arsenide and high index aluminum gallium arsenide, a commonly microfabricated Bragg reflector used in semiconductor spontaneous emission experiments. Inserting these values into the last two equations and solving numerically yields N=9.23 and $<\omega>=2.43\times10^{15}$ rad/s. Since N must be an integer, N=9 may be used and a correspondingly recalibrated $<\omega>=2.45\times10^{15}$ rad/s may be used. By calculating the values of $\omega_1$ and $\omega_2$, the values $\langle\omega\rangle=2.164\times10^{15}$ rad/s and $\Delta\omega=0.126\times10^{15}$ rad/s are obtained. The small difference in the final $\Delta\omega$ and $\langle\omega\rangle$ from the initial values can be attributed to the fact that N had to be rounded to the nearest integer value when the root finding routine found an non-integer root. It will be understood by those having skill in the art that when using a root-finding routine, non-physical results such as negative values for n or a mid-gap frequency $\omega_0$ that is larger than the upper band edge of the structure should be rejected.

The theoretical model also predicts that the group index is very sensitive to local material index. The variation $\delta n_g/\delta n$ in group index, with respect to either of the two indices $n_1$ or $n_2$ making up the photonic bandgap structure, increases exponentially with the number of periods N in the structure. This increase impacts the bandwidth $\Delta\omega$ of the transmission resonance, which decreases exponentially with N, but not quite as rapidly as $\delta n_g/\delta n$ increases. For example, in a 30 period structure, $\delta n_g/\delta n$ is three orders of magnitude greater than that for an equivalent amount of bulk material, and the resonance bandwidth is 2.3 nm. For a 50 period structure, $\delta n_g/\delta n$ is four orders of magnitude larger than the bulk value, and the resonance bandwidth is 0.68 nm.

Figure 4:
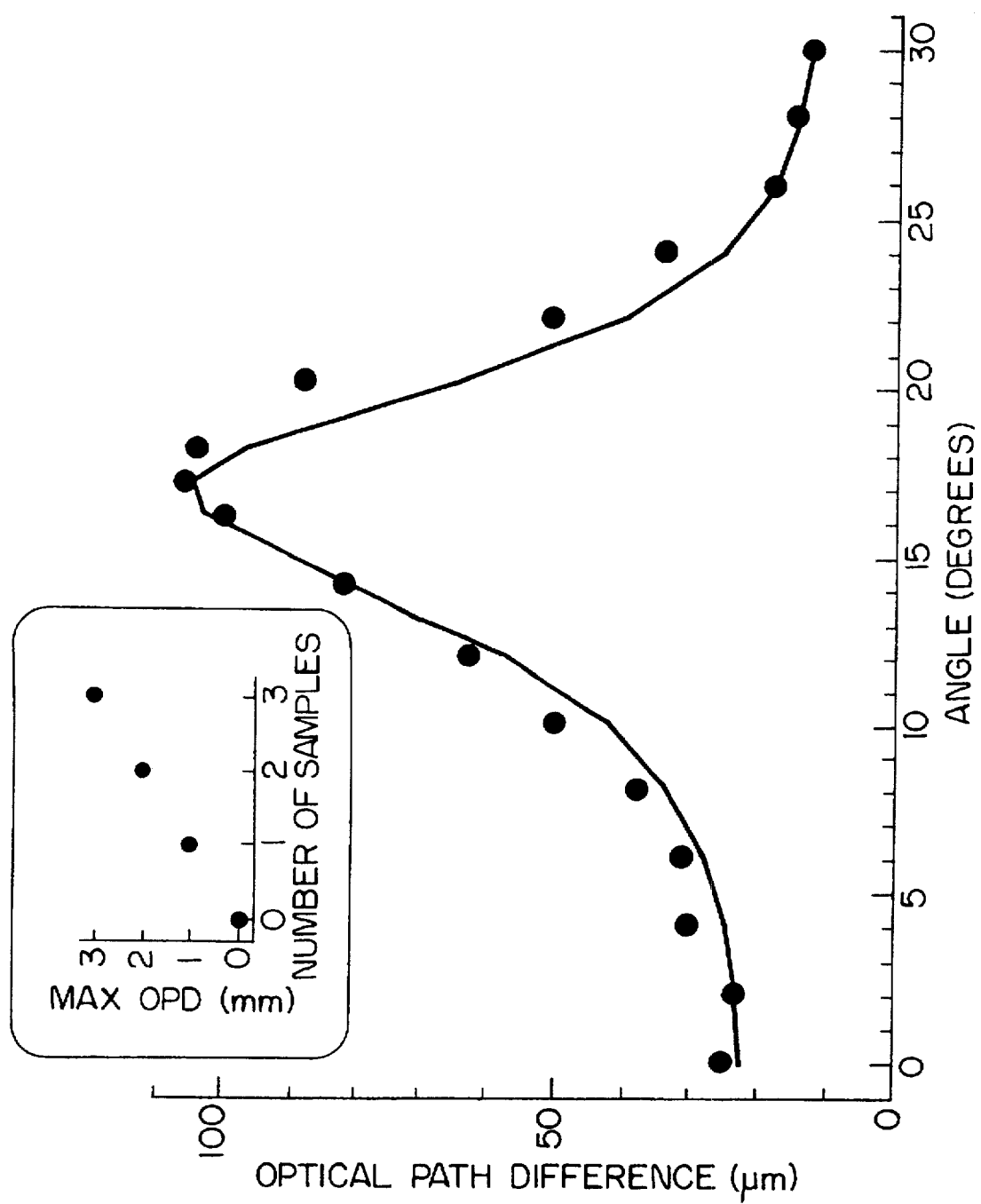
FIG. 4 graphically illustrates optical path difference versus angle of incidence of a pulse which is incident on a photonic bandgap structure according to the present invention.

Experimental verification of the predictions may be obtained by measuring the group delay as a function of the orientation of the photonic bandgap structure 20 normal relative to the direction of the incidence of the ultrashort optical pulse 13a. See FIG. 4. Varying the photonic bandgap structure orientation tunes the transmission resonance relative to the pulse spectrum. The resulting orientation-dependent delay may be calculated by a matrix transfer method and by pulse propagation simulations. The calculated delay agrees well with the experiment. The transmission T may also be measured as a function of photonic bandgap structure orientation. Similarly good agreement is found between experiment and theory. The maximum group delay clearly closely coincides with maximum transmission, as predicted. Comparison of the theoretical and experimental transmission plots may provide a precise measure of the photonic bandgap structure period. The period was found to be within 0.43% of the designed period. The simulations appear to confirm that atomic layer scale precision is important in obtaining the observed phenomena.

The experiment was performed by introducing the photonic bandgap structure 20 in one arm of an autocorrelator and then measuring the change in optical delay as a function of bandgap structure orientation. A harmonically mode-locked erbium fiber laser was used, with wavelength 1.529 μm, a repetition rate of 1.8 GHz, and nonlinear polarization-shaping to reduce the pulse duration to 2 ps. Each data point was obtained by averaging six autocorrelation traces. The one σ deviation in precision was approximately 1 μm of optical path delay. The available angular stage limited the angular measurement precision for the bandgap structure to ±0.25 degrees.

The photonic bandgap structure included a 1.1166 μm spacer of AlAs as a stop etch and a GaAs substrate 355 μm thick. The structure was designed so that the long-wavelength band edge approximated the wavelength of the test laser (1528.5 nm). The delay due to the photonic bandgap structure was determined by etching the photonic bandgap structure superstrate in one region of the sample, measuring the net optical delay for the substrate with photonic bandgap structure, and then measuring the delay for the substrate alone. The difference in optical delay is plotted in FIG. 4 as a function of orientation angle. The maximum delay for the photonic bandgap structure was 108 μm at a 17 degree angle of incidence. For the 8 μm thick layer (spacer plus photonic bandgap structure), this corresponds to a group index of $n_g=13.5$. The spacer and substrate cause a small reduction in group index compared to the case of the free-standing photonic bandgap structure (FIG. 2). Note that the group index at 1.529 μm in bulk GaAs is $n_g=3.55$. The maximum transmittance, not including losses at the substrate interface, was about 95%. For comparison, the optical path change in bulk GaAs for the experimental angular change would be less than 1% or about 2μm.

As already described, in practice it is often necessary to construct the photonic bandgap structure on a substrate and buffer layer. The presence of the substrate and buffer layer will generally modify the optical properties of the structure and thus should be considered in optimizing the design for the structure. This design can be accomplished by using the matrix transfer technique as outlined in Chapter 1 of *Computer-Aided Techniques for the Design of Multilayer Filters* by H. M. Liddell, Adam Hilger, Ltd; Bristol (1981). The equations given above may be used to calculate the desired properties of a photonic bandgap structure for a given signal center frequency $\langle\omega\rangle$ and bandwidth $\Delta\omega$, and then the matrix transfer method may be used to determine how small changes in those parameters can be made to account for the presence of the substrate and buffer layers. Thus, by making small changes in the average layer thickness, the final parameters of the structure can be obtained that will have a transmission resonance precisely at $\langle\omega\rangle$, and a transmission bandwidth $\Delta\omega$.

An example photonic bandgap structure might include a substrate such as gallium arsenide, a stop-etch or buffer layer of AlAs, and the photonic bandgap structure on the AlAs stop etch layer. The matrix transfer method assumes the signal light is incident normally on the photonic bandgap structure, so that the electric field E, at any point is dependent only on z; the direction normal to the interface planes. The electric field may be written (assuming $e^{i\omega t}$ time dependence) as $$E=Ae^{ikz}+Be^{-ikz}$$

where $k=2\pi n/\lambda$ is the complex propagation wave number in the layer. Here, n is the total refractive index of the layer; n can be both complex and spatially variable. Once the electric field is known in one plane of constant z, it may then be calculated at an adjacent plane, separated in space by no more than one interface, by applying boundary continuity conditions. In matrix form this is accomplished by the following:

$$\begin{bmatrix} A_{m+1} \\ B_{m+1} \end{bmatrix} = 1/2 \begin{bmatrix} 1+Z & 1-Z \\ 1-Z & 1+Z \end{bmatrix} \begin{bmatrix} e^{-i\delta_m} & 0 \\ 0 & e^{+i\delta_m} \end{bmatrix} \begin{bmatrix} A_m \\ B_m \end{bmatrix}$$

Figure 6:
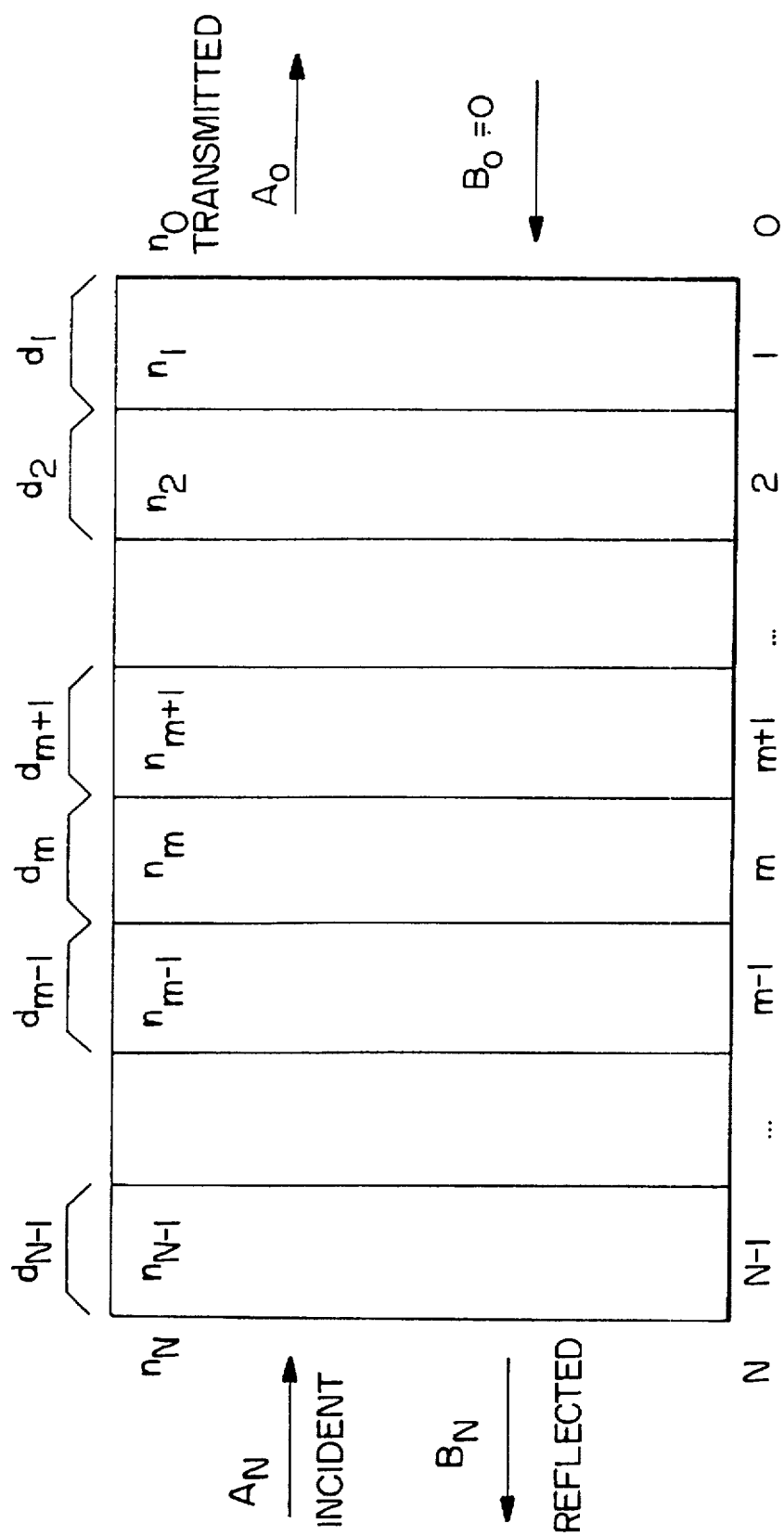
FIG. 6 is a schematic representation of a photonic bandgap structure according to the invention.

With this matrix equation, the total electric field amplitudes of all right-and left-traveling wave amplitudes at any plane inside the photonic bandgap structure may be found if both the right-and left-traveling wave amplitudes are known at any other plane. This is the case for the m=0 plane, where $A_0$ is set to some arbitrary number and $B_0$ is set to zero (since there are no left-traveling waves to the right of the structure). See FIG. 6.

Having found the transmitted field amplitudes for the structure including support and buffer layers, both the group delay and the transmission as a function of frequency may be calculated. In practice, some experimentation with the parameters such as layer thickness shows that the dependence of the transmission resonance on those parameters can be estimated and a final set of layer thicknesses found in a few iterations.

Note that surfaces separated by more than a pulse length in optical path from the photonic bandgap structure will not generally produce scattered components that significantly contribute to the transmitted pulse, and can generally be neglected from the computation. In essence the matrix transfer technique is a steady state approach that has been adapted to this particular application. If the above rule is observed and the above technique is used to compute the group delay, the calculated performance generally will closely approximate the performance observed in practice.

To summarize, the design may be accomplished by using the analytical expressions given above to determine the number of layers and the thicknesses of the layers given an assumed n, and $n_1$, and then adjustments for additional features such as a substrate and stop etch layer may be made by using the matrix transfer technique to find the transmitted signal for the modified structure. This latter step typically requires some trial and error, but the analytical expressions provide a sufficiently close approximation that these trial and error solutions usually converge quickly to a useful set of parameters.

Techniques for matching the location and bandwidth of a band edge resonance to the frequency and bandwidth of the photonic signal for predetermined delay will now be described for the general embodiment of FIG. 1B. The embodiment of FIG. 1A may be regarded as a specific example of a general, finite, N-period, photonic bandgap structure. The specific example of FIG. 1A is an N-period, quarter-wave stack composed of N unit cells, with each unit cell including two layers of index n, and $n_1$ with the condition that the thickness a of the $n_1$ layer and b of the $n_2$ layer are related to an arbitrary reference wavelength $\lambda_0$ by the quarter-wave relation $a=\lambda_0/(4n_1)$ and $b=\lambda_0/(4n_2)$. FIGS. 7A and 7B graphically illustrate the indices of an entire photonic bandgap structure 20 and a unit cell, respectively.

Although this particular example of a photonic bandgap structure is presently commonly used in photonics, it is not the only photonic bandgap structure. In fact, it is one subset of the general class of finite, one-dimensional, N-period, photonic bandgap structures which include an N-period layered stack composed of N unit cells, each of which has an arbitrary index profile, n(x), as illustrated in FIG. 1B. FIGS. 8A and 8B graphically illustrate the variable index of photonic bandgap structure 20' and a unit cell 18, respectively. The photonic bandgap structure of FIG. 1A has a specific index profile, $n(x)=n_1$ (if 0<x<a) and $n(x)=n_2$ (if a<x<b).

It has been found, according to the invention, that there are 2N transmission resonances of unit transmittance in each pass band of the transmission spectrum of any N-period photonic bandpass structure (except for the first pass band where there are only N transmission resonances), independent of the form n(x) that comprises the index profile of each period, provided that n(x) is variable across the thickness of the unit cell. Moreover, there are 2N group delay maxima in each pass band of the transmission group delay curve of the N-period photonic bandgap structure (except for the first pass band where there are only N delay maxima), independent of the form of the index profile n(x) of each unit cell. In general, these group delay maxima will be aligned with the transmission resonances. Finally, the transmission spectrum of an N-period photonic bandpass structure will display bandgaps or stop band regions where the transmission is exponentially small, provided the unit cell index profile n(x) is not constant. In addition, the group delay maxima located adjacent the stop band regions will display a global maximum in the overall group delay of the structure for that pass band, independent of the form of the unit layer cell index profile.

The fact that there are exactly 2N transmission resonances of unit transmittance in each higher order pass band of an arbitrary N-period photonic bandgap structure, follows from the following equation:

$$\frac{1}{T_N} = 1 + \frac{\sin^2 N\beta}{\sin^2\beta}\left[\frac{1}{T}-1\right]$$

where $T_N$ is the transmittance of the N-period photonic bandgap structure, and T is the transmittance of each unit cell of index profile n(x) that make up the structure. Here $\beta$ is the Bloch phase, defined by: $\text{Re}\{1/t\}=\cos\beta$, where t is the complex transmission of the unit cell. The fact that there are 2N transmission resonances apparently arises from the fact that $\sin^2(N\beta)$ is periodic with period 2N, which is true independent of the form of T, t or $\beta$, that depend specifically on the unit cell profile. Thus, there are 2N resonances that occur whenever $N\beta$ is a multiple of $\pi$, and hence $\sin^2(N\beta)=0$, showing that the transmittance $T_N$ is unity.

The mode density (or reciprocal of the group velocity) is $$\rho_N = \frac{1}{D}\frac{\frac{1}{2}\frac{\sin^2 N\beta}{\sin\beta}\left(\eta'+\frac{\eta\xi\xi'}{1-\xi^2}\right)-\frac{N\eta\xi'}{1-\xi^2}}{\cos^2 N\beta = \eta^2\left(\frac{\sin N\beta}{\sin\beta}\right)^2}.$$

Figure 9A:
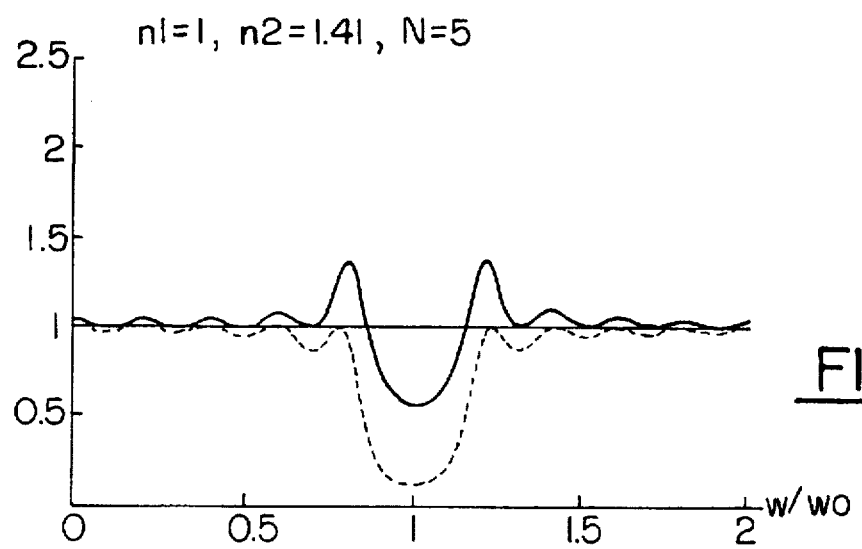
FIGS. 9A and 9B graphically illustrate density of modes for photonic bandgap structures.
Figure 9B:
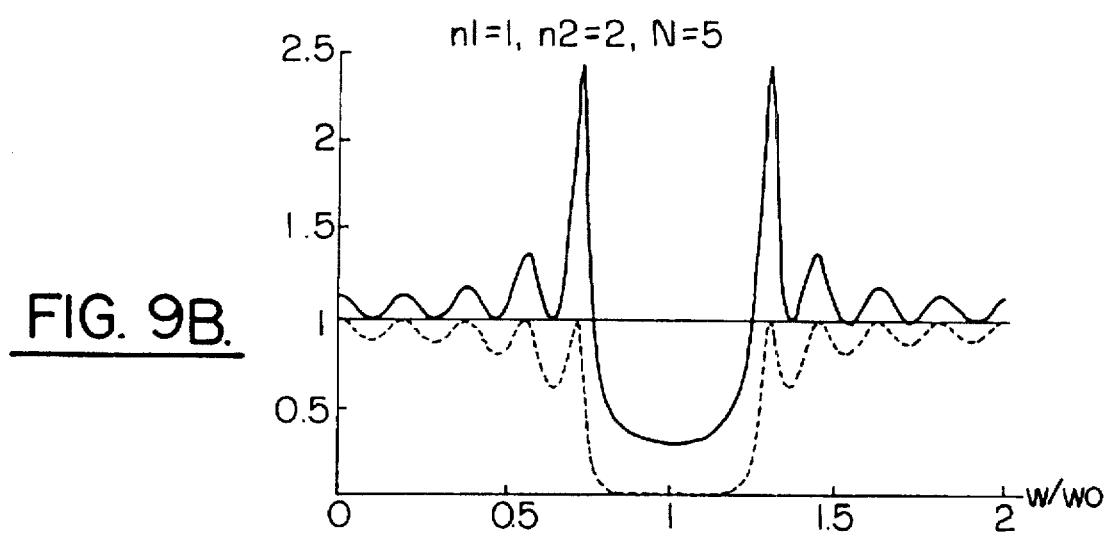

Here D=Nd, $\epsilon$ denotes x/T (i.e., $\cos\beta$), $\eta$=y/T where t=x+iy is the complex transmission coefficient for the unit cell, and $\epsilon'$ and $\eta'$ are derivatives of these quantities with respect to $\omega$. A plot of the density of modes $\rho_N$ ($\rho_N$ is the reciprocal of the group velocity and hence gives a direct measure of the delay produced by the structure) and the transmittance $T_N$ is given in FIGS. 9A and 9B for a five period (N=5), photonic bandgap structure with $n_1=1$, $n_2=1.41$ in FIG. 9A; and $n_1=1$ and $n_2=2$ in FIG. 9B. Note the five transmission resonances on either side of the bandgap in both plots corresponding to N=5. As the value of $n_2$ increases from 1.41 in FIG. 9A to 2 in FIG. 9B, the gap becomes more defined and the density of modes resonances become greater in magnitude. The maxima and minima of the density of modes and transmission appear to line up; however, there is a small amount of offset between the extreme values of the two curves that becomes rapidly negligible for increasing number of periods N. The density of modes is normalized to the bulk group velocity divided by the speed of light so that the density of modes plotted in FIGS. 9A and 9B is actually equal to $c\rho_N/v^{bulk}$.

Also, note that the equation for the transmission shows that whenever $N\beta=m\pi$, m$\epsilon\{0,1,\ldots,N-1\}$, then the $\sin 2N\beta$ term is equal to zero and $T_N=1$ exactly. This phenomenon corresponds to the N transmission resonances seen in FIGS. 9A and 9B. Unexpectedly, in general, these transmission resonances of $T_N$ are unity, independent of the unit cell's transmission T. In other words, even if T($\omega$) is practically zero at these points, and hence the unit cell is highly reflective, nevertheless the entire N-period structure is transparent. These "sweet spots" are properties of the finite periodicity of the structure alone, not of the unit cell. These resonances are known in the theory of finite quarter-wave structures-but the fact they are a general property of any N-period one-dimensional dielectric structure has not been fully appreciated. See, e.g., D. W. L. Sprung et al. Am. J. Phys. 61, 1118 (1993). In addition, E. Brown has recently observed similar resonances in transmission experiments with finite three-dimensional photonic bandgap crystals indicating that the phenomenon may generalize to higher dimensional lattices. When $N\beta$ is equal to odd multiples of $\pi/2$, then the transmission curve $T_N$ will be close to, but not exactly at, a local minima. The approximation improves very rapidly with increasing N. This is apparently due to the fact that $\sin 2N\beta$ is a maximum at this point, and since it is the most rapidly varying term, the entire function will be close to its minimum, since $\sin 2N\beta \sim 1/T$ is largest there.

As regards the density of modes $\rho_N$, the fact that the peaks of $T_N$ and $\rho_N$ very nearly line up may be used to determine the conditions that produce the maximum delay. This approximation improves rapidly with increasing N so that the density of modes (or group index) will have its maxima at approximately $\beta=m\pi/N$, $m\epsilon\{0,1 \ldots N-1\}$. This apparently can be understood by inspecting the equation for $\rho_N$. When $N=m\pi$, then $\sin N\beta=0$, $\sin 2N\beta=0$, and $\cos^2 2N\beta=1$. Hence, the most rapidly varying term in the denominator of $\rho_N$ is nearly as small as possible, while the numerator remains proportional to large N– tending to maximize $\rho_N$. Evaluating the density of modes at these approximate maxima gives the general equation:

$$\rho_N^{max}\Big|_{\beta=\frac{m\pi}{N}} \cong -\frac{1}{D} \frac{N\eta\xi'}{1-\xi^2}\Big|_{\beta=\frac{m\pi}{N}}$$

This provides a direct way to calculate the group delay at the band edge resonance without plotting the entire curve.

Thus, there are 2N maxima in the group delay that line up with these transmission resonances. It can also be shown that the group delay will be globally maximal in each pass band at the resonances closest to a photonic bandgap.

For the specific case of a quarter-wave photonic bandgap structure (FIG. 1A), the equations needed for matching the bandwidth $\Delta\omega$ and the carrier frequency $<\omega>$ of the photonic band edge resonance signal to those of the photonic bandgap structure can be written down and solved explicitly, as described above. In the general case when the unit layer cell has an arbitrary index profile $n(x)$, no specific formula appears to be applicable. Rather, a series of steps may be used to find the parameters of the structure needed to construct the device:

1. Specify an initial index profile $n(x)$ functional form geometry for a unit cell layer of thickness d. For example, for the quarter-wave structure of FIG. 1A, $n(x)=n_1$ (if $0<x<a$) and $n(x)=n_2$ (if $a<x<b$), where $a+b=d$. Another example might be a humpbacked profile: $n(x)=\sin^2(\pi x/d)$, (if $0<x<d$).

2. Determine the group index $\rho_n=1/v_g$ for an N unit cell structure, for some initial value of the required number of unit cells N. Vary the integer N until the width of one of the band edge resonances in group index matches the required bandwidth, $\Delta\omega$, of the photonic signal to be delayed.

3. Now that the bandwidth matches, fix N, and rescale the index profile of the unit cell by making the rescaling transform $n(x)\rightarrow\alpha n(\beta x)$, where $\alpha$ and $\beta$ are allowed to vary continuously. For example, if the initial profile was $n(x)=\sin^2(\pi x/d)$, then the rescaled profile to be varied is $\alpha n(\beta x)=\alpha\sin^2(\beta\pi x/d)$. Vary $\alpha$ and $\beta$ and continue to determine the group index for each variation, until the central location $<\omega>$ of the band edge resonance under consideration matches the desired carrier frequency of the photonic signal, to within the desired degree of accuracy. Since D=Nd, and d is fixed, varying N will vary the thickness D.

4. If the process of matching the predetermined frequency in step 3 has disturbed slightly the desired match of bandwidth found in step 2, then repeat steps 2 and 3 iteratively, until convergence to the desired degree of accuracy in both bandwidth $\Delta\omega$, and carrier frequency $<\omega>$ has been achieved.

Given an initial value for the functional form $n(x)$ of the unit layer cell index profile, and given the desired bandwidth $\Delta\omega$, and carrier frequency $<\omega>$ of the photonic signal to be delayed, the above steps will yield as an output the values for the parameters N, $\alpha$ and $\beta$ which are needed to build the photonic bandgap structure, given a fixed thickness per unit cell d. In other words, an N-layered photonic bandgap structure, each of whose layers are identical, and have an index profile given by the function $f(x)=\alpha n(\beta x)$, is specified.

Note that the original functional form of the index profile $n(x)$ and its thickness d are specified in advance. This function may be constrained by the ability to fabricate layers with arbitrarily varying index profiles. Easiest to make are bi-layer profiles: $n(x)=n_1$ or $n_2$, as in FIG. 1A. However, one may fabricate tri-layer profiles, $n(x)=n_1, n_2, n_3$, quad layer profiles, etc. In general, these step-like profiles may be easiest to fabricate. However, with improvements in microfabrication, sawtooth profiles such as $n(x)=mx+b$, humpback profiles such as $n(x)=\sin^2(\pi x/d)$, etc., may be fabricated in the future. Externally applied electromagnetic fields, with appropriate spatial variations, may also be used to create spatial variations of the index of refraction within the photonic bandgap structure, in profiles which may be difficult to attain using conventional microfabrication techniques. All of these profiles may produce a delay apparatus and method, since the properties of the delay apparatus and method are independent of the form of the unit cell index profile.

Additional tunable group delay may be obtained, also with nearly invariant transmission of pulse form and energy, by adding photonic bandgap structures in a linear array. In this experiment, the photonic bandgap structures were left on their substrates. It was found that the group delay accumulates linearly with the number of bandgap structures with no measurable distortion of pulse shape. See the inset in FIG. 4. The substrates, however, prevented exploration of an arrangement of more than two bandgap structures closer together than the substrate thickness.

Sequences of more closely spaced, photonic bandgap structures were also explored using simulations. The simulations appeared to indicate that, as one places additional photonic bandgap structures closer than half a pulse width, feedback begins to perturb the structure of the band-edge transmission resonances. This appears to alter the group index shown in FIG. 2, and the array of individual bandgap structures appears to act as a single, extended, photonic bandgap structure.

Accordingly, some additional considerations are generally warranted to optimally design iterated sequences of photonic bandgap structures. For example, it is possible to obtain twice the group delay with negligible reduction of bandwidth by placing a second photonic bandgap structure at approximately an optical wavelength after the first, and making small variations in the layer thicknesses to obtain maximum group delay with minimum loss of bandwidth. Alternatively, successive photonic bandgap structures may be used to accumulate additional group delay with no loss of bandwidth if successive structures are spaced by at least an optical pulse width apart. In yet another alternative, photonic bandgap structures can be placed closer than a pulse length in space apart, and the optimum structure discerned using the matrix transfer technique can be used in a trial and error type of approach to find the maximum group delay with minimum constraint on bandwidth. In yet another alterative, optical isolating material may be placed between the photonic bandgap structures in order to make the entire device as compact as possible.

Figure 5A:
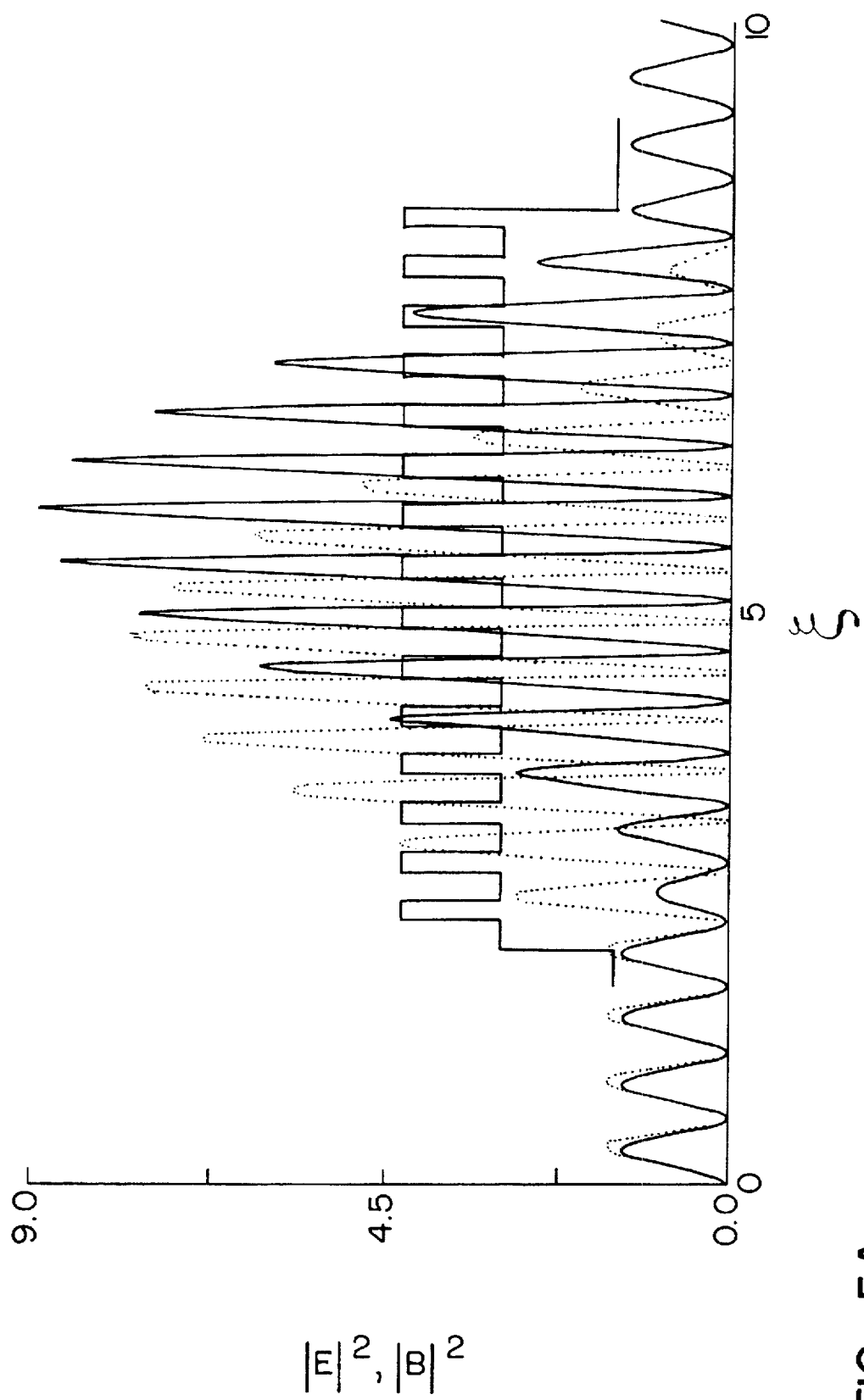
FIGS. 5A and 5B graphically illustrate instantaneous electric and magnetic field profiles and the spatial distribution of electromagnetic momentum respectively, for a delay apparatus and method according to the present invention.
Figure 5B:
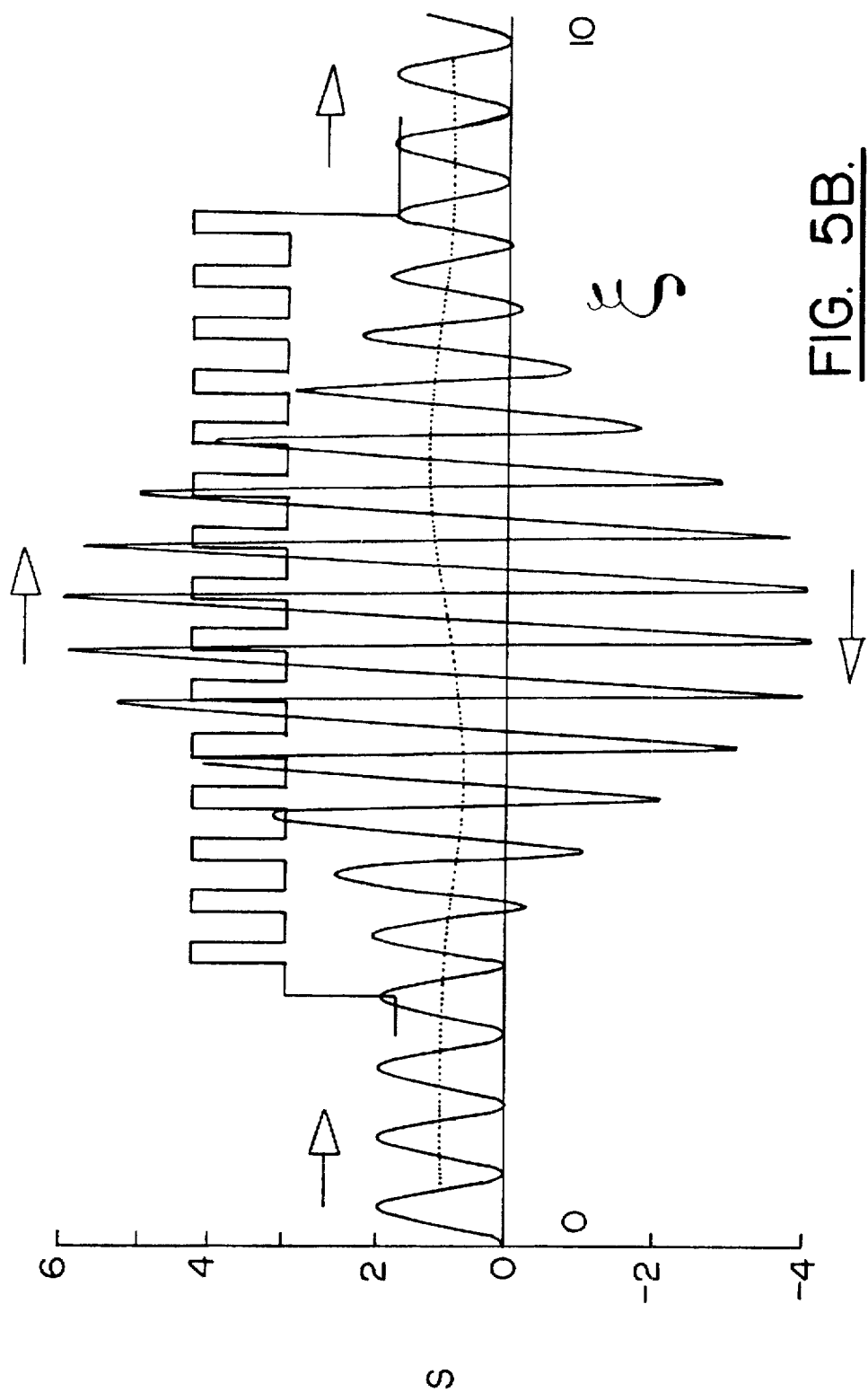

The results of these simulations may be used to gain insight into the apparent physical origin of this novel excited state. FIG. 5A graphically illustrates the instantaneous electric field $E^2$ (solid line) and magnetic field $B^2$ (dotted line) profiles of a simulated, ultrashort pulse, tuned to a closest band-edge resonance of a photonic bandgap structure. The index profile is also plotted (not to scale). FIG. 5A illustrates the intensity at the entrance to, within, and at the exit from the photonic crystal for an instant when the pulse is approximately halfway through the bandgap structure. FIG. 5B graphically illustrates the spatial distribution of electromagnetic momentum (Poynting vector-solid line) corresponding to the same case depicted in FIG. 5A. Both plots are for the same instant in the transmission process.

Points above the axis correspond to momentum propagating to the right and points below the axis correspond to momentum propagating to the left (as indicated by the arrows). The mean local momentum averaged over a unit cell is also shown as a dotted line. The mean local momentum is always positive, corresponding to net forward propagating momentum. The local momentum, averaged over a unit cell, is useful in visualizing the relationship between the local value of the net forward-directed momentum and the stored momentum in the quasi-standing wave generated in the photonic bandgap structure. The Poynting vector, $S=E \times B$, is given in normalized units of $c/4\pi$. The strong localization of the electromagnetic energy within the crystal is coincident with a marked spatial separation of the electric and magnetic fields. This case also shows a marked displacement of the electric and magnetic field envelopes. Momentum (energy) appears to scatter from the forward propagating fields into the quasi standing wave in the first half of the photonic bandgap structure and then appears to scatter back from the quasi-standing wave into the forward propagating fields in the second half of the crystal.

FIGS. 5A and 5B may be interpreted as a combination of the forward-propagating electromagnetic field of the ultrashort pulse and quasi-standing wave that transiently forms in the photonic bandgap structure. In this model, the first half of the photonic bandgap structure scatters energy from the forward-propagating fields into the quasi-standing wave, while the second half of the photonic bandgap structure scatters energy from the quasi-standing wave back into the forward-propagating fields. Inside the photonic bandgap structure, the wave appears to oscillate within the central region, carrying and transiently storing substantial electromagnetic energy in a circulatory manner. The case depicted in FIGS. 5A and 5B is near the peak of the pulse. As might be expected, the transfer from the forward-propagating wave to the quasi-standing wave is larger than the inverse process when the leading edge of the pulse is entering the photonic bandgap structure. The reverse appears to be true for the trailing edge of the pulse.

It appears that this highly dynamic state plays a key role in producing the observed phenomena of high transmission and large group index. In particular, the additional anomalous momentum and energy flow appears central to the understanding of the momentum exchange mechanism. This additional anomalous energy and momentum flow appears to give the delay apparatus and method many of its unique properties.

These simulation techniques also describe quantitatively the transfer of substantial net momentum from the pulse to the photonic bandgap structure, as well as the inverse process. Essentially, the only change appears to be a strong group delay for the ultrashort pulse. A roughly 20–40% transfer and reacquisition of momentum is shown for parameters typical of the experimental case. In visualizing this process, it may be useful to bear in mind that this momentum transfer occurs sequentially along the length of the pulse. Apparently, this is because only a fraction of the pulse is in the photonic bandgap structure at any one instant, because the photonic bandgap structure length is short compared to the pulse length in space. The simulations also apparently show that the strong spatial localization of the optical field in the crystal accompanies a complementary strong delocalization of the optical field in momentum space, as suggested by FIG. 5B.

Accordingly, the group delay for an optical pulse can exhibit a dramatic increase when the pulse is spectrally matched to a band edge transmission resonance (in some embodiments a closest band edge transmission resonance) of a photonic bandgap structure. Strong transient localization of the optical energy in the photonic bandgap structure provides a large and sensitively adjustable group delay. This occurs in combination with a close approach to invariant transmission of pulse form, energy, and momentum. The properties appear to follow from application of Maxwell's equations to the combined system of photonic bandgap structure and ultrashort optical pulses. Furthermore, the group-delay phenomenon appears to accumulate linearly in sequences of these photonic bandgap structures. Accordingly, arrays of relatively closely spaced photonic bandgap structures appear capable of providing very large adjustable group delays.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. Apparatus for delaying photonic signals of predetermined frequency and predetermined bandwidth by a predetermined delay, comprising:

a predetermined plurality of first and second alternating layers which exhibit a series of photonic bandgaps, said plurality of first and second alternating layers being generally parallel and including an initial layer and a last layer, said first and second alternating layers having predetermined thicknesses and having predetermined indices of refraction, wherein said predetermined plurality, said predetermined thicknesses and said predetermined indices of refraction cooperate to produce a photonic band edge transmission resonance in said plurality of first and second alternating layers, having a photonic band edge transmission resonance center frequency corresponding to said predetermined frequency, and a corresponding photonic band edge transmission resonance bandwidth which is at least as wide as said predetermined bandwidth, to thereby impart said predetermined delay to said photonic signals which pass therethrough;

means for directing said photonic signals into said first layer such that said photonic signals propagate in a direction generally perpendicular to said plurality of first and second alternating layers; and means for receiving the delayed photonic signals which emerge from said last layer.

2. A delaying apparatus according to claim 1 wherein said plurality of first and second layers produce a plurality of photonic band edge resonances for each photonic bandgap, at a plurality of frequencies extending away from the corresponding photonic bandgap, and wherein said predetermined plurality, said predetermined thicknesses and said predetermined indices of refraction cooperate to produce a photonic band edge transmission resonance in said plurality of first and second alternating layers, corresponding to one of said plurality of frequencies which is closest to a bandgap, and having a photonic band edge transmission resonance center frequency corresponding to said predetermined frequency, and a photonic band edge transmission resonance bandwidth which is at least as wide as said predetermined bandwidth.

3. A delaying apparatus according to claim 1 wherein said photonic signals are optical signals and wherein said plurality of first and second layers comprise a plurality of alternating layers of aluminum arsenide and gallium arsenide.

4. A delaying apparatus according to claim 1 further comprising:

means for varying the index of refraction of at least one of said first and second alternating layers to thereby vary said predetermined delay.

5. Apparatus for delaying photonic signals of predetermined frequency and predetermined bandwidth by a predetermined delay, comprising:

a predetermined plurality of first and second alternating layers which exhibit a series of photonic bandgaps, said first and second alternating layers having predetermined thicknesses and having predetermined indices of refraction, wherein said predetermined plurality, said predetermined thicknesses and said predetermined indices of refraction cooperate to produce a photonic band edge transmission resonance in said plurality of first and second alternating layers, having a photonic band edge transmission resonance center frequency corresponding to said predetermined frequency, and a corresponding photonic band edge transmission resonance bandwidth which is at least as wide as said predetermined bandwidth, to thereby impart said predetermined delay to said photonic signals which pass therethrough, wherein said predetermined thicknesses and said predetermined plurality are described by a solution of the following two simultaneous equations:

$$1/T_{12} = [1 + \cos \pi/N \cos \pi/(2N)]/[1 - \cos (\pi \Delta \omega/\omega_0) \cos (\pi \omega/\omega_0)]$$

$$1/T_{12} = [\sin \pi/N \sin \pi/(2N)]/[\sin (\pi \Delta \omega/\omega_0) \sin (\pi \omega/\omega_0)],$$

where $T_{12} = 4n_1n_2/(n_1+N_2)^2$, $n_1$ is the index of refraction of said first alternating layers, $n_2$ is the index of refraction of said second alternating layers, N is said predetermined plurality, $\omega_0$ is the mid-gap frequency of said photonic bandgap structure, and $a = \pi c/(2\omega_0 n_1)$ and $b = \pi c/(2\omega_0 n_2)$, where a is said predetermined thickness of said first alternating layers, b is said predetermined thickness of said second alternating layers and c is the free space speed of light.

6. A method of delaying photonic signals of predetermined frequency and predetermined bandwidth by a predetermined delay, comprising the steps of:

directing the photonic signals into a predetermined plurality of first and second alternating layers which are generally parallel and which exhibit a series of photonic bandgaps, said first and second alternating layers having predetermined thicknesses and having predetermined indices of refraction, wherein said predetermined plurality, said predetermined thicknesses and said predetermined indices of refraction cooperate to produce a photonic band edge transmission resonance in said plurality of first and second alternating layers, having a photonic band edge transmission resonance center frequency corresponding to said predetermined frequency, and a corresponding photonic band edge transmission resonance bandwidth which is at least as wide as said predetermined bandwidth, to thereby impart said predetermined delay to said photonic signals which pass therethrough;

wherein said directing step comprises directing the photonic signals into the plurality of first and second alternating layers such that the photonic signals propagate in a direction generally perpendicular to the plurality of first and second alternating layers; and receiving the delayed electromagnetic pulses which emerge from said predetermined plurality of first and second alternating layers.

7. A method according to claim 6 wherein said plurality of first and second layers produce a plurality of photonic band edge resonances for each photonic bandgap, at a plurality of frequencies extending away from the corresponding photonic band edge frequency, and wherein said predetermined plurality, said predetermined thicknesses and said predetermined indices of refraction cooperate to produce a photonic band edge transmission resonance in said plurality of first and second alternating layers, corresponding to one of said plurality of frequencies which is closest to a bandgap, and having a photonic band edge transmission resonance center frequency corresponding to said predetermined frequency, and a photonic band edge transmission resonance bandwidth which is at least as wide as said predetermined bandwidth.

8. A method according to claim 6 wherein said photonic signals are optical signals and wherein said plurality of first and second layers comprise a plurality of alternating layers of aluminum arsenide and gallium arsenide.

9. A method according to claim 6 further comprising the step of:

varying the index of refraction of at least one of said first and second alternating layers, to thereby vary the predetermined delay.

10. A method of delaying photonic signals of predetermined frequency and predetermined bandwidth by a predetermined delay, comprising the steps of:

directing the photonic signals into a predetermined plurality of first and second alternating layers which exhibit a series of photonic bandgaps, said first and second alternating layers having predetermined thicknesses and having predetermined indices of refraction, wherein said predetermined plurality, said predetermined thicknesses and said predetermined indices of refraction cooperate to produce a photonic band edge transmission resonance in said plurality of first and second alternating layers, having a photonic band edge transmission resonance center frequency corresponding to said predetermined frequency, and a corresponding photonic band edge transmission resonance bandwidth which is at least as wide as said predetermined bandwidth, to thereby impart said predetermined delay to said photonic signals which pass therethrough, wherein said predetermined thicknesses and said predetermined plurality are described by a solution of the following two simultaneous equations:

$$1/T_{12} = [1+\cos \pi/N \cos \pi/(2N)]/[1 - \cos(\pi\Delta\omega/\omega_0) \cos(\pi\omega/\omega_0)]$$

$$1/T_{12} = [\sin \pi/N \sin \pi/(2N)]/[\sin(\pi\Delta\omega/\omega_0) \sin(\pi\omega/\omega_0)],$$

where $T_{12} = 4n_1n_2/(n_1+n_2)^2$, $n_1$ is the index of refraction of said first alternating layers, $n_2$ is the index of refraction of said second alternating layers, N is said predetermined plurality, $\omega_0$ is the mid-gap frequency of said photonic bandgap structure, and $a=\pi c/(2\omega_0 n_1)$ and $b=\pi c/(2\omega_0 n_2)$, where a is said predetermined thickness of said first alternating layers, b is aid predetermined thickness of said second alternating layers and c is the free space speed of light; and receiving the delayed electromagnetic pulses which emerge from said predetermined plurality of first and second alternating layers.

11. Apparatus for delaying photonic signals of predetermined frequency and predetermined bandwidth by a predetermined delay, comprising:

a predetermined plurality of unit cells which exhibit a series of photonic bandgaps, said plurality of unit cells being generally parallel and including a first unit cell and a last unit cell, said predetermined plurality of unit cells each having a predetermined thickness and having variable index of refraction which varies across said predetermined thickness, wherein said predetermined plurality and said predetermined thickness cooperate to produce a photonic band edge transmission resonance in said plurality of unit cells, having a photonic band edge transmission resonance center frequency corresponding to said predetermined frequency, and a corresponding photonic band edge transmission resonance bandwidth which is at least as wide as said predetermined bandwidth, to thereby impart said predetermined delay to said photonic signals which pass therethrough means for directing said photonic signals into said first unit cell such that said photonic signals propagate in a direction generally perpendicular to said plurality of unit cells; and means for receiving the delayed photonic signals which emerge from said last unit cell.

12. A delaying apparatus according to claim 11 wherein said plurality of unit cells produce a plurality of photonic band edge resonances for each photonic bandgap, at a plurality of frequencies extending away from the corresponding photonic bandgap, and wherein said predetermined plurality and said predetermined thickness cooperate to produce a photonic band edge transmission resonance in said plurality of unit cells, corresponding to one of said plurality of frequencies which is closest to a bandgap, and having a photonic band edge transmission resonance center frequency corresponding to said predetermined frequency, and a photonic band edge transmission resonance bandwidth which is at least as wide as said predetermined bandwidth.

13. A delaying apparatus according to claim 11 wherein said variable index of refraction is a continuously or discontinuously variable index of refraction which varies across said predetermined thickness.

14. A delaying apparatus according to claim 11 further comprising:

means for further varying the variable index of refraction of at least one of said unit cells to thereby vary said predetermined delay.

15. A method of delaying photonic signals of predetermined frequency and predetermined bandwidth by a predetermined delay, comprising the steps of:

directing the photonic signals into a predetermined plurality of unit cells which are generally parallel and which exhibit a series of photonic bandgaps, said predetermined plurality of unit cells each having a predetermined thickness and having variable index of refraction which varies across said predetermined thickness, wherein said predetermined plurality and said predetermined thickness cooperate to produce a photonic band edge transmission resonance in said plurality of unit cells, having a photonic band edge transmission resonance center frequency corresponding to said predetermined frequency, and a corresponding photonic band edge transmission resonance bandwidth which is at least as wide as said predetermined bandwidth, to thereby impart said predetermined delay to said photonic signals which pass therethrough, wherein said directing step comprises directing the photonic signals into the plurality of unit cells such that the photonic signals propagate in a direction generally perpendicular to the plurality of unit cells; and receiving the delayed electromagnetic pulses which emerge from said predetermined plurality of unit cells.

16. A method according to claim 15 wherein said plurality of unit cells produce a plurality of photonic band edge resonances for each photonic bandgap, at a plurality of frequencies extending away from the corresponding photonic bandgap, and wherein said predetermined plurality and said predetermined thickness cooperate to produce a photonic band edge transmission resonance in said plurality of first and second alternating layers, corresponding to one of said plurality of frequencies which is closest to a bandgap, and having a photonic band edge transmission resonance center frequency corresponding to said predetermined frequency, and a photonic band edge transmission resonance bandwidth which is at least as wide as said predetermined bandwidth.

17. A method according to claim 15 wherein said variable index of refraction is a continuously or discontinuously variable index of refraction which varies across said predetermined thickness.

18. A method according to claim 15, further comprising the step of:

further varying the variable index of refraction of at least one of said unit cells, to thereby vary the predetermined delay.

19. A photonic signal delaying apparatus, which delays photonic signals of a predetermined frequency and a predetermined bandwidth, comprising:

a photonic bandgap structure having a plurality of generally parallel layers including a first layer and a last layer;

means for directing the photonic signals into said first layer such that the photonic signals propagate in a direction generally perpendicular to said plurality of layers, wherein said photonic bandgap structure has a photonic band edge resonance at the predetermined frequency of the photonic signal, and having a corresponding photonic band edge resonance bandwidth which is at least as wide as the predetermined bandwidth of the photonic signal, to thereby impart a predetermined delay to the photonic signal which propagates therethrough.

20. A delaying apparatus according to claim 19 wherein said photonic bandgap structure has a closest photonic band edge resonance at the predetermined frequency of the photonic signal, and a corresponding closest photonic band edge resonance bandwidth which is at least as wide as the predetermined bandwidth of the photonic signal.

21. A delaying apparatus according to claim 19 further comprising:
   means for varying the index of refraction of the photonic bandgap structure to thereby vary said predetermined delay.

22. A delaying apparatus according to claim 19 wherein said photonic bandgap structure comprises a predetermined plurality of first and second alternating layers which exhibit a photonic bandgap, and first and second alternating layers having predetermined thicknesses and having predetermined indices of refraction.

23. A delaying apparatus according to claim 19 wherein said photonic bandgap structure comprises a predetermined plurality of unit cells, each having a predetermined thickness and a variable index of refraction which varies across said predetermined thickness.

24. A photonic signal delaying method which delays photonic signals of a predetermined frequency and a predetermined bandwidth, comprising the step of:
   applying the photonic signal to a photonic bandgap structure having a plurality of generally parallel layers including a first layer and a last layer, wherein said applying step comprises directing the photonic signals into the plurality of generally parallel layers such that the photonic signals propagate in a direction generally perpendicular to the plurality of layers, and wherein the photonic bandgap structure has a photonic band edge resonance at the predetermined frequency of the photonic signal, and having a corresponding photonic band edge resonance bandwidth which is at least as wide as the bandwidth of the photonic signal, to thereby impart a predetermined delay to the photonic signal which propagates therethrough.

25. A method according to claim 24 wherein said photonic bandgap structure has a closest photonic band edge resonance at the predetermined frequency of the photonic signal, and a corresponding closest photonic band edge resonance bandwidth which is at least as wide as the predetermined bandwidth of the photonic signal.

26. A method according to claim 24 further comprising the step of:
   varying the index of refraction of the photonic bandgap structure to thereby vary said predetermined delay.

27. A method according to claim 24 wherein said photonic bandgap structure comprises a predetermined plurality of first and second alternating layers which exhibit a photonic bandgap, and first and second alternating layers having predetermined thicknesses and having predetermined indices of refraction.

28. A method according to claim 24 wherein said photonic bandgap structure comprises a predetermined plurality of unit cells, each having a predetermined thickness and variable index of refraction which varies across said predetermined thickness.

* * * * *

UNITED STATES PATENT AND TRADEMARK OFFICE
CERTIFICATE OF CORRECTION

PATENT NO.   : 5,751,466
DATED        : May 12, 1998
INVENTOR(S)  : Dowling, et al.

It is certified that error appears in the above-identified patent and that said Letters Patent is hereby corrected as shown below:

On the title page, column 1, Assignee section, please add -- Government Of The United States, as represented by the Secretary Of The Army -- .

Signed and Sealed this

Second Day of March, 1999

Attest:

Q. TODD DICKINSON

Attesting Officer

Acting Commissioner of Patents and Trademarks